United States Patent
Welch

(10) Patent No.: US 10,471,797 B2
(45) Date of Patent: Nov. 12, 2019

(54) SUSPENSION TUNING DEVICE AND KIT

(71) Applicant: Glenn S. Welch, Belmont, NH (US)

(72) Inventor: Glenn S. Welch, Belmont, NH (US)

( * ) Notice: Subject to any disclaimer, the term of this patent is extended or adjusted under 35 U.S.C. 154(b) by 21 days.

(21) Appl. No.: 15/655,346

(22) Filed: Jul. 20, 2017

(65) Prior Publication Data
US 2019/0023097 A1 Jan. 24, 2019

(51) Int. Cl.
*B60G 17/02* (2006.01)
*B60G 11/54* (2006.01)

(52) U.S. Cl.
CPC ............ *B60G 17/021* (2013.01); *B60G 11/54* (2013.01)

(58) Field of Classification Search
CPC .... F16F 1/13; F16F 1/041; F16F 1/047; F16F 1/12; F16F 1/22; B60G 17/021; B60G 11/54
USPC ............................................ 267/33, 287, 286
See application file for complete search history.

(56) References Cited

U.S. PATENT DOCUMENTS

| | | | | |
|---|---|---|---|---|
| 2,703,234 | A * | 3/1955 | Tapp | F16F 1/13 267/287 |
| 2,801,841 | A * | 8/1957 | Blythe | F16F 1/13 267/287 |
| 2,904,329 | A * | 9/1959 | Joseph | F16F 1/13 267/287 |
| 3,330,548 | A * | 7/1967 | Starnes | F16F 1/13 267/287 |
| 4,098,498 | A * | 7/1978 | Da Silva | F16F 1/13 267/287 |
| 2003/0222386 | A1* | 12/2003 | Duerre | B60G 11/16 267/166 |
| 2004/0183243 | A1* | 9/2004 | Chen | F16F 1/13 267/286 |
| 2009/0020930 | A1* | 1/2009 | Wirges | B60G 15/068 267/140.13 |

FOREIGN PATENT DOCUMENTS

| | | | | |
|---|---|---|---|---|
| EP | 1672241 | A1 * | 6/2006 | F16F 1/126 |
| FR | 1046237 | A * | 12/1953 | F16F 1/13 |

* cited by examiner

*Primary Examiner* — Melanie Torres Williams
(74) *Attorney, Agent, or Firm* — Michael Persson; Catherine Napjus; Chisholm, Persson & Ball, PC

(57) ABSTRACT

A suspension tuning ring formed as a hollow a cylinder having an outer surface and an inner surface defining a wall, a top, a bottom, and a slit through the wall. The outer surface has an outer diameter that is larger than the outer diameter of a coil spring and the inner surface has an inner diameter that is less than the diameter of a coil spring. The top and bottom of the ring each include a top and bottom retaining groove that are spaced apart, shaped and dimensioned to accommodate each coil. At least one of the top and bottom retaining grooves are dimensioned, or include separate retaining structures, to retain the coils within the retaining grooves. The ring assembled by parting it along the slit and fitted between adjacent coils of a coil spring of a suspension system such that the coils are retained within the top and bottom retaining grooves.

18 Claims, 13 Drawing Sheets

SUSPENSION TUNING DEVICE AND KIT

FIELD OF THE INVENTION

The present invention relates to the field of suspension system tuning devices and, in particular, to devices for tuning the front suspensions of snowmobiles and other offroad vehicles.

BACKGROUND

Snowmobiling is a popular winter activity in cold climates. The steering of snowmobiles is conventionally accomplished by a pair of ground engageable skis that are mounted to the front suspension system of the snowmobile and are turned in the direction in which the snowmobile is to be propelled. The skis 20 and front suspension system 12 of a conventional snowmobile 10 are shown in FIG. 1A. The front suspension system 12 to which the skis 20 are attached includes a pair of A-arms 14, a pair of shock absorbers 18, and a pair of coil springs 16 disposed around the shock absorbers 18. The primary purpose of the coil springs 16 has traditionally been to support the weight of the snowmobile 10 and maintain its ride height, while the primary purpose of the shock absorbers 18 is to dampen the movement of the springs 16.

Most conventional suspension systems are adjustable to some extent. The vast majority of adjustments to the springs 16 are geared toward setting ride height, while the vast majority of adjustments to the shock absorbers 18 are geared toward changes in trail conditions or personal feel preferences.

As shown in FIG. 1C, a rigid chassis 30 links a snowmobile's front suspension 12 and rear suspension 40. Adjustments made to the front suspension 12 will transfer energy to affect the rear suspension 40. Lowering the front suspension 12 will unload the rear suspension 40 causing it to top out. Raising the front suspension 12 will cause a low rear ride height, simulating the need for more spring preload in the rear suspension 40. Accordingly, once the desired height is reached for the front suspension 12, and the rear suspension 40 is properly adjusted, it is preferable to avoid changing this height to account for different trail conditions or to tune the ride of the snowmobile.

Tuning adjustments are typically made to shock absorbers 18 and most may be adjusted to stiffen or soften the ride. Increasing the stiffness of the shock absorbers 18 will reduce contact with the trail and steering ability. Conversely, decreasing the stiffness will enhances contact with the trail and steering ability, but increases the risk of harsh bottoming out on rough terrain and body roll during cornering. Accordingly, as general rule, the shock absorbers 18 should be adjusted to be as soft as possible to allow for controlled steering while preventing excessive body roll and the bottoming out of the springs 16 when the skis 20 hit rough terrain. Given this fact, it is also preferable to avoid making tuning adjustments to the shock absorbers 18 once a desired ride is found.

Front suspension springs 16 are of typically of two types: linear and progressive. Linear springs 16 are the traditional type and they allow for comfort in groomed trail conditions. However, as shown by the dashed line in FIG. 2, these springs compress at a linear rate and are more prone to bottoming out under heavy suspension load.

Progressive springs 16 were developed to address this issue. A progressive spring 16 compresses at a linear rate until a certain load or displacement, after which it compresses at a non-linear rate, requiring far more force to be applied before bottoming out occurs. This is shown by the dashed line in FIG. 3, which plots the spring rate for a typical progressive spring. This allows for comfort in groomed trail conditions but progressively stiffens the ride as these springs compress for better cornering and handling. However, nearly all factory installed springs are linear springs and progressive springs are typically fairly costly aftermarket items purchased by racers and other high performance users and, therefore, most snowmobiles have linear springs. Further, progressive springs have a linear rate cutoff and a set non-linear rate and once installed, are not adjustable. Finally, many progressive springs achieve their progressive nature through the variability of distance between spring turns and have a very small distance between some turns, effectively limiting the amount of travel of the spring before bottoming occurs.

Therefore, there is a need for a way to tune a snowmobile's ride without adjusting the height of spring 16, stiffness of shock absorbers 18 or rear suspension 40, that allows a linear spring to function like a progressive spring, and that allows the performance of the spring to be quickly and easily changed.

SUMMARY OF THE INVENTION

The present invention is a suspension tuning device, kit and system that allows a snowmobile's ride to be tuned without adjusting the spring height, shock absorber stiffness or rear suspension, that allows a linear spring to function like a progressive spring, and that allows the performance of the spring to be quickly and easily changed.

In its most basic form, the suspension tuning device is a hollow elastomeric ring that is shaped and dimensioned to fit between adjacent coils of a coil spring of a suspension system such that compression of the coil spring will cause the ring to be compressed. Microcellular urethane has substantial advantages over rubber and other conventional materials for use in the rings of the present invention. It is corrosion resistant, easily moldable, flexible, progressively compresses, and retains its performance characteristics, including elasticity and hysteresis down to at least −40 degrees Celsius and up to at least 90 degrees Celsius. Accordingly, the use of an elastomeric material having comparable performance characteristics to microcellular urethane as a ring material is required in the present invention.

The ring takes the form of a cylinder having an outer surface and an inner surface defining a wall, a top, a bottom, and a slit through the wall. The outer surface has an outer diameter that is larger than the outer diameter of the coil spring and the inner surface has an inner diameter that is less than the diameter of the coil spring. The top and bottom of the ring include a top and bottom retaining groove, respectively, that are spaced apart, shaped and dimensioned to accommodate each spring coil diameter. At least one of the top and bottom retaining grooves are dimensioned, or include separate retaining structures, to retain the coils within the retaining grooves. The ring is assembled by parting it along the slit and fitted between adjacent coils of a coil spring of a suspension system such that the coils are retained within the top and bottom retaining grooves.

In a preferred embodiment, each retaining groove includes retaining structures that exert force upon the spring to hold it in place within the groove. In some embodiments, these retaining details are substantially hemispherical bumps that extend inward from predetermined points about each groove to position the ring in specific relation to the spring coils. In some such embodiments, the tops of the bumps include smaller nubs that reduce vibration and isolate noise. In other embodiments, the inside of each retaining groove includes a waveform shape, such as a sine wave or superimposed sine wave, that is dimensioned to enhance contact with the spring and reduce vibration noise.

In some embodiments, the ring also includes a high frequency dampening structure within each retaining groove. These structures are preferably disposed at the center of each groove and are preferably shaped to dampen high frequency vibration energy. However, it is recognized that such high frequency dampening structures may also be used to dampen low frequency vibration energy and that such structures are variable in nature and should not be viewed as being limited to high frequency dampening.

In some embodiments, the outer surface and/or inner surface of the ring includes compression regulation structures that alter the spring rate characteristics of the ring. These structures are preferably bumps and grooves formed along the surface, which act to hinder or enhance compression of the ring.

In still other embodiments, the ring is manufactured from at least two different types of microcellular urethane selected to allow the spring rate characteristics of the ring to be altered. In such embodiments, it is preferred that the wall of the ring include a central wall section of more rigid microcellular urethane and top and bottom wall sections made from softer microcellular urethane.

The basic embodiment of the kit of the present invention includes a pair of suspension tuning devices for assembly onto a pair of front suspension coil springs. In some embodiments, the kit includes multiple sets of suspension tuning devices, each having different spring rate characteristics, which may be interchanged by a user to tune the snowmobile's ride.

The system of the present invention includes a coil spring and the suspension tuning device of the present invention removably attached thereto.

Therefore, it is an aspect of the present invention to provide a suspension tuning device that regulates compression of the spring and controls the area of compression deformation.

It is an aspect of the present invention to provide a suspension tuning device that eliminates noise during compression and rebound.

It is an aspect of the present invention to provide a suspension tuning device that increases primary suspension rate in a controlled range of travel.

It is an aspect of the present invention to provide a suspension tuning device that is made from a material that retains its performance characteristics down to at least −40 degrees Celsius and up to at least 90 degrees Celsius.

It is an aspect of the present invention to provide a suspension tuning device that allows for high frequency tuning with varying densities.

It is an aspect of the present invention to provide a suspension tuning device that reduces vibration into the steering system.

It is an aspect of the present invention to provide a suspension tuning device that allows for a linear suspension spring to be stiffened and function as a progressive suspension spring.

It is an aspect of the present invention to provide a suspension tuning device that improves ski or wheel contact to off-road surfaces.

It is an aspect of the present invention to provide a suspension tuning device that improves handling in "washboard" surface conditions and at high speed It is an aspect of the present invention to provide a suspension tuning device that reduces roll acceleration for improved performance and safety in cornering.

It is an aspect of the present invention to provide a suspension tuning device that increases inside ski and wheel contact during cornering.

It is an aspect of the present invention to provide a suspension tuning device that allows the ride of a snowmobile, or other off-road vehicle, to be tuned without adjusting the spring height, shock absorber stiffness or rear suspension.

It is a still further aspect of the present invention to provide a suspension tuning device that allows rear springs/suspension rate to be progressive, keeping skis/tires planted to the surface while cornering.

DETAILED DESCRIPTION

Figure 4A:
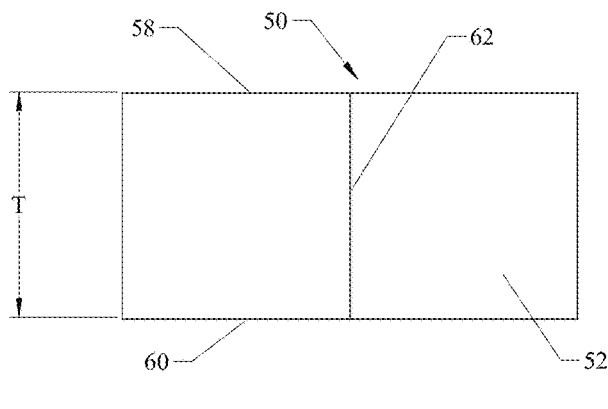
FIG. 4A is a perspective view of a basic embodiment of the suspension tuning ring of the present invention.
Figure 4C:
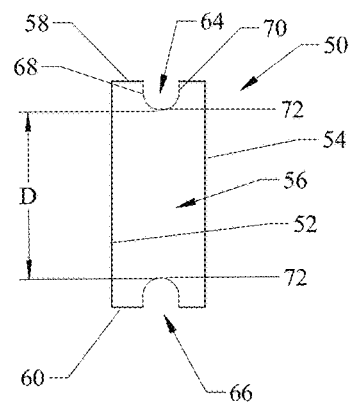
FIG. 4C is a side cross sectional view of the of the suspension tuning ring of FIG. 4A showing the retention grooves.
Figure 4B:
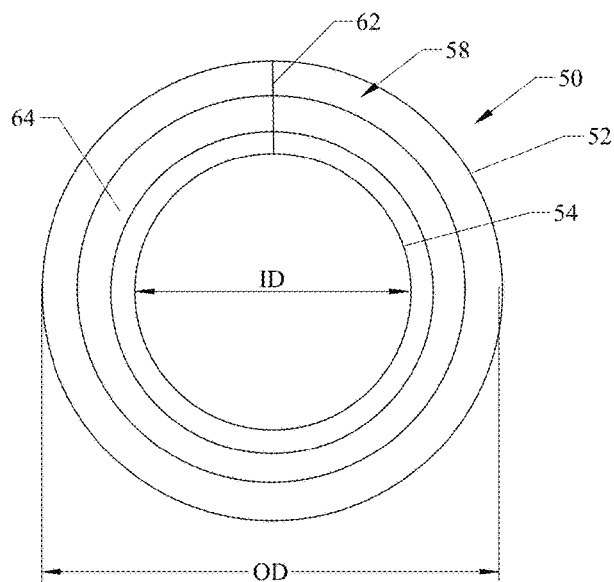
FIG. 4B is a top view of the suspension tuning ring of FIG. 4A.
Figure 5:
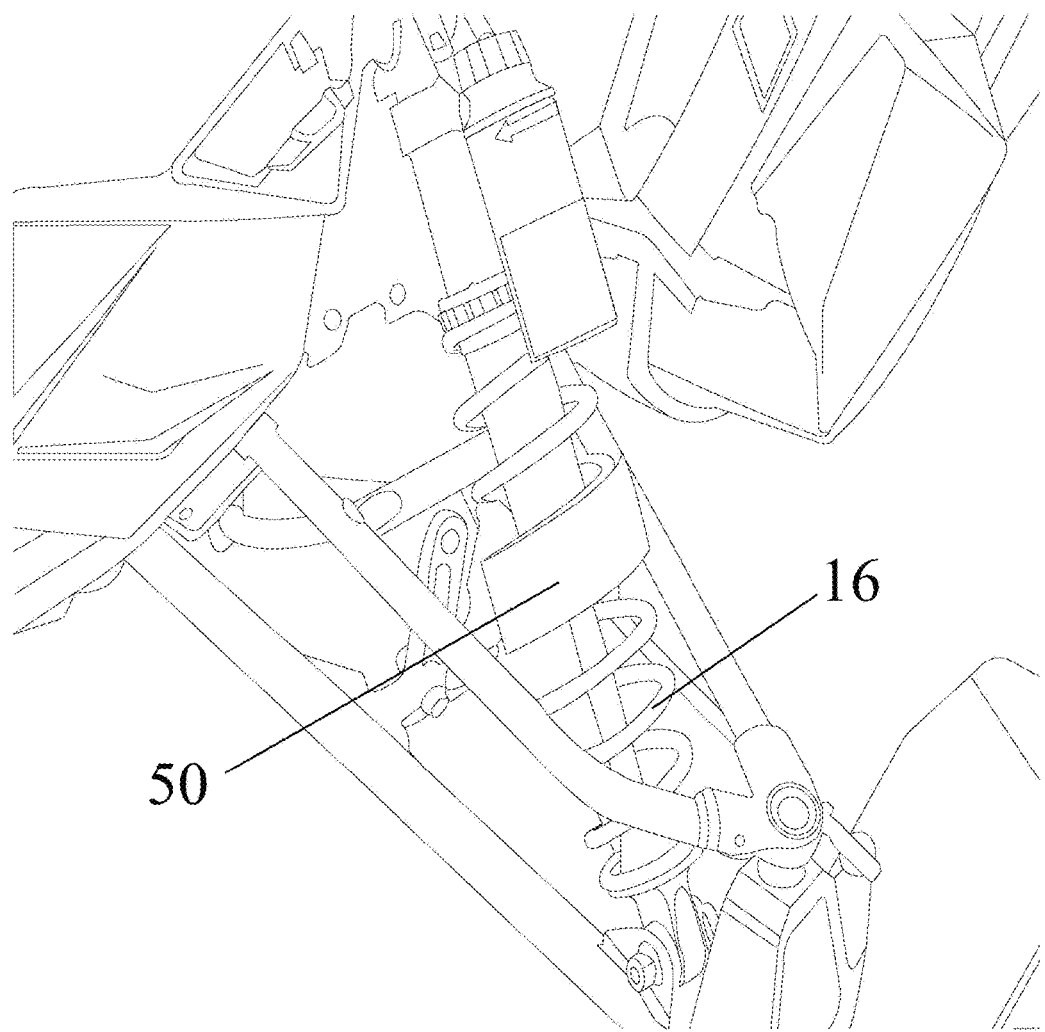
FIG. 5 is a perspective view of the suspension tuning ring of the present invention attached to a front suspension coil spring of a snowmobile.

Referring first to FIGS. 4A through 4C, the suspension tuning device of the present invention is a hollow microcellular urethane ring 50 that is shaped and dimensioned to fit between adjacent coils of coil spring of a suspension system, such as the front coil spring 16 of the snowmobile of FIG. 5. As noted above, microcellular urethane has substantial advantages over rubber and other conventional materials for use in the rings of the present invention. It is corrosion resistant, easily moldable, flexible, resilient, and retains its performance characteristics, including elasticity and hysteresis down to at least −40 degrees Celsius and up to at least 90 degrees Celsius. Accordingly, the use of an elastomeric material having comparable performance characteristics to microcellular urethane as the ring material is required in the present invention. The preferred microcellular urethane material is a fully cross-linked, aromatic isocynate based urethane having a density of 0.25 to 0.85 grams per cubic centimeter, a tensile strength of at least 5.0 Mpa, and a rebound resilience of 45-60%. However, other types of microcellular urethane, having different characteristics, may be uses. Further, as discussed below, in some cases, multiple types of microcellular urethane are used in a single ring 50 in order to alter the performance of the ring 50.

Figure 6:
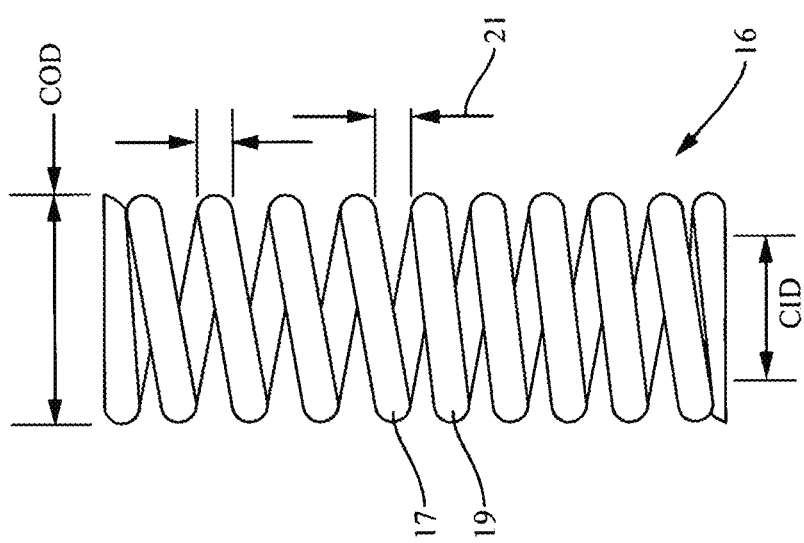
FIG. 6 is a side view of a prior art coil spring.

The ring 50 takes the form of a cylinder having an outer surface 52 and an inner surface 54 defining a wall 56, a top 58, a bottom 60, and a slit 62 through the wall 56. The outer surface 52 has an outer diameter OD that is greater than the outer diameter COD of the coil spring 16 (see FIG. 6) and the inner surface 54 has an inner diameter ID that is less than the inner diameter CID of the coil spring 16. The top 58 and bottom 60 of the ring 50 define a thickness T, which is greater than the space 21 between adjacent coils 17, 19 of the coil spring 16 to which the ring 50 is to be attached. The top 58 of the ring 50 includes a top retaining groove 64 and the bottom 60 of the ring 50 includes a bottom retaining groove 66. Each retaining groove 64, 66 is shaped and dimensioned to accommodate and retain a coil 17 of the spring 16 and the distance D between the top retaining groove 64 and the bottom retaining groove 66 is such that the ring 50 fits within the space 21 between adjacent coils 17, 19 of the coil spring 16 when the coils 17, 19 are fitted within the top retaining groove 64 and the bottom retaining groove 66.

In the embodiment of FIGS. 4A-4C, each retaining groove 64, 66 includes a pair of sides 68, 70 extending from a semicircular bottom 72 having a diameter that is slightly less than the coil material diameter of the coils 17, 19 of the spring 16. This allows the coil 17, 19 to slightly expand the sides 68, 70 of each retaining groove 64, 66 and be retained within each retaining groove 64, 66 by the inward force of the sides 68, 70 when inserted within the grooves 64, 66. However, as discussed in detail below, other embodiments of the ring 50 include separate retaining structures to retain the coils 17, 19 of the spring 16.

Figure 1A:
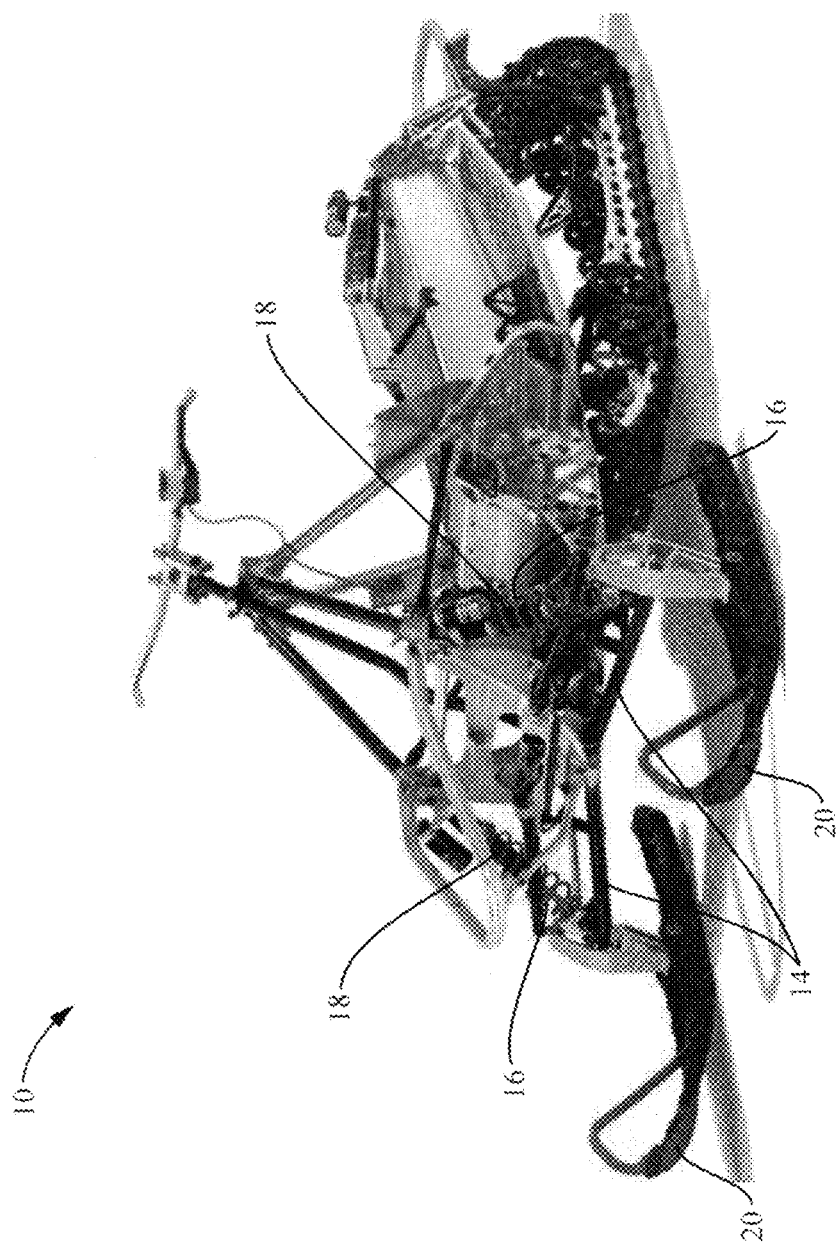
FIG. 1A is an isometric view of a prior art partially assembled snowmobile showing the skis, front suspension, chassis and rear suspension.
Figure 1B:
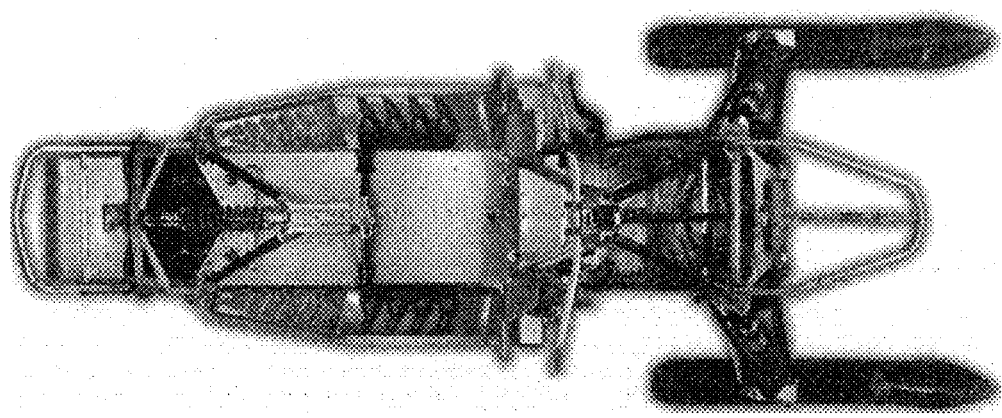
FIG. 1B is a top perspective view of the partially assembled snowmobile of FIG. 1A.
Figure 1C:
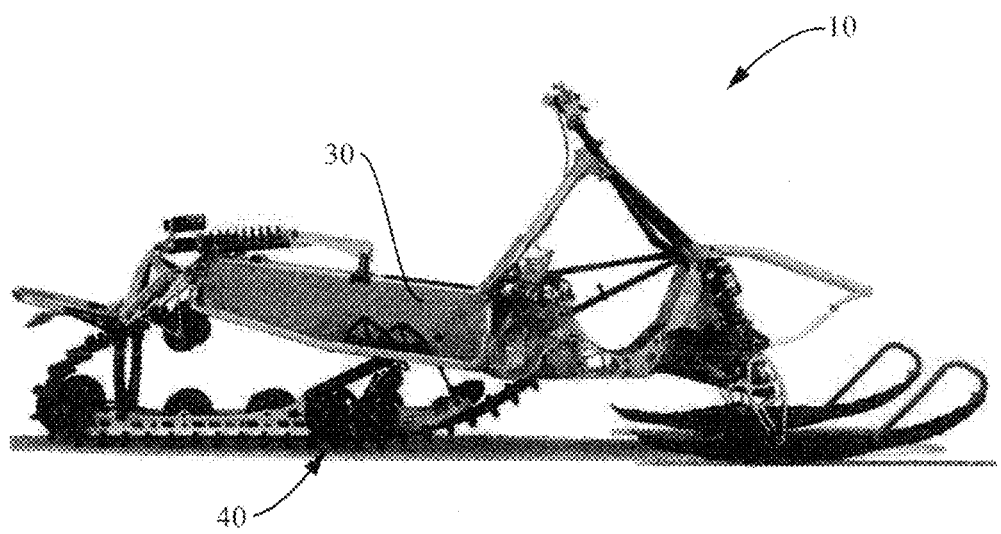
FIG. 1C is a side perspective view of the partially assembled snowmobile of FIG. 1A.
Figure 2:
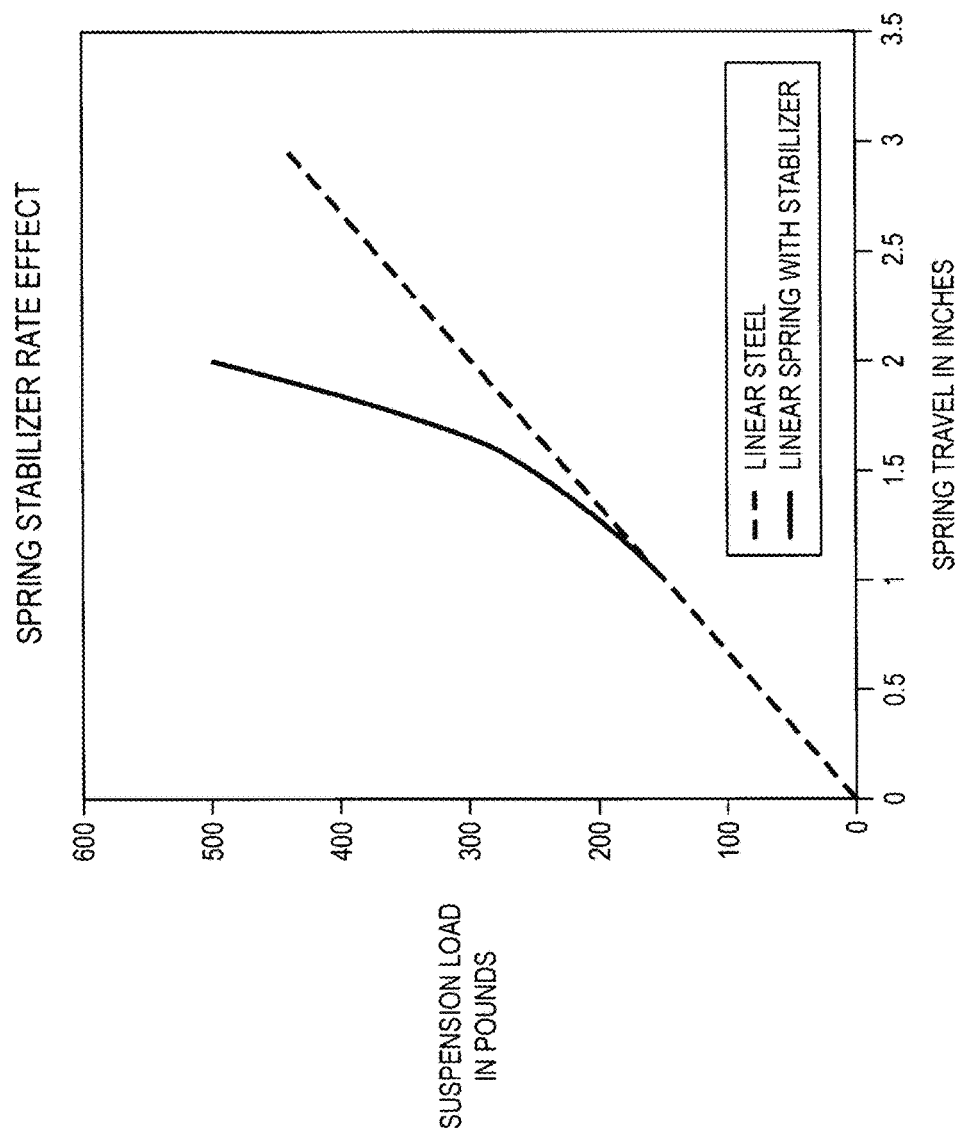
FIG. 2 is a graph comparing spring rates for a linear spring versus spring rate for the linear spring combined with the suspension tuning device of the present invention.
Figure 3:
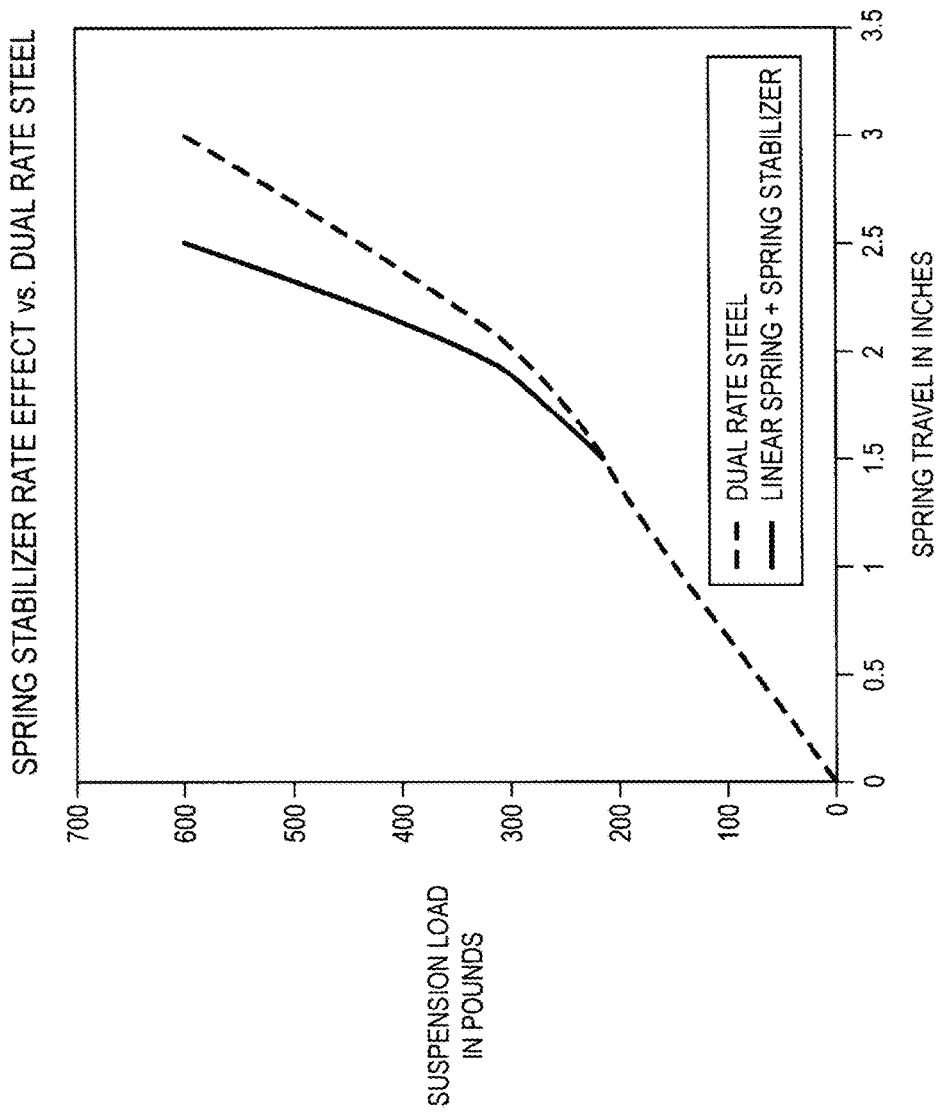
FIG. 3 is a graph comparing spring rates for a progressive spring versus spring rate for the progressive spring combined with the suspension tuning device of the present invention.

The ring 50 is assembled by parting it along the slit 62 and fitting it between adjacent coils 17, 19 of a coil spring 16 and fitting each coil 17, 19 within the retaining grooves 64, 66 proximate to such coil 17, 19 such that each coil 17, 19 is retained within a retaining groove 64, 66. This results in the arrangement shown in FIG. 5. When the spring 16 is compressed, the distance between coils 17, 19 shortens, exerting a compressive force on the ring 50. As shown by the solid lines in FIGS. 2 and 3, a ring 50 of the present invention assembled to a linear spring will result in the combined spring system performing in a manner similar to that of a progressive spring. Further, as shown in FIG. 3, attaching a ring 50 of the present invention assembled to a linear spring will result in the combined spring system performing in a stiffer manner than would be the case with a progressive spring. Although not shown, the ring 50 may be attached to a progressive spring to enhance stiffness and further limit spring travel, effectively preventing the spring from bottoming out.

Figure 7:
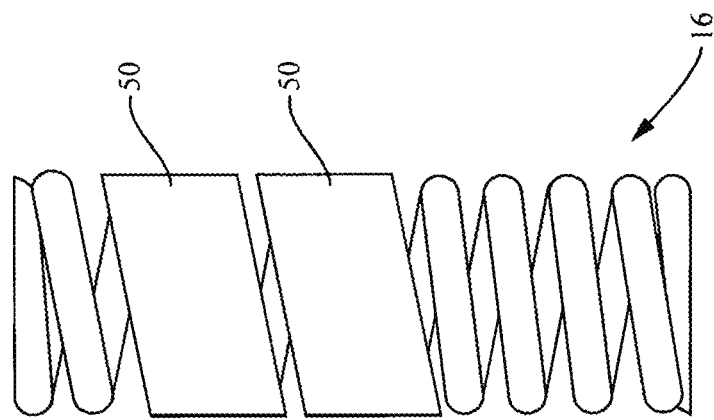
FIG. 7 is a side view of a prior art coil spring to which two tuning rings is attached.

As shown in FIG. 7, more than one ring 50 of the present invention may be attached to a spring 16 and the kit 100 of the present invention includes multiple rings 50 that may be attached to a coil spring 16 to tune the performance of the spring 16. The preferred kit 100 includes multiple pairs of rings 50, each having different spring characteristics, which may be attached in various arrangements to tune the springs 16 to a desired feel.

Referring now to FIGS. 8A-8F, the retaining grooves 64, 66 of the preferred ring 50 include various retaining structures that retain a coil 17, 19 of the spring 16 within leach groove 64, 66. It is noted that, although FIGS. 8A-8F show only top retaining groove 64 and coil 17, the bottom retaining groove 66 and coil 19 may be similarly arranged. It is understood that retaining features are not required features within the retaining grooves 64, 66. In some embodiments, the inherent tension between the adjacent coils 17, 19 being held within retaining grooves 64, 66 is sufficient means to retain at least one coil 17, 19 within at least one groove 64, 66.

As a coil spring compresses and expands, the coil 17 translates both linearly and rotationally. This translation can result in the generation of noise from the movement of the coil 17 within the retaining groove 64. This noise can be reduced by minimizing the contact area between the coil and the sides 68, 70 of the retaining groove. In some embodiments of ring 50, the interior of a portion of a mold that forms the ring 50 is coated with glass or diamond materials, which results in each retaining groove 64 having a rough surface that minimizes this contact area. In other embodiments, including each of the embodiments of FIGS. 8A-8F, the bottom 72 of the retaining groove 64, 66 has a diameter that is greater than the diameter of the coil 17 such that contact between the sides 68, 70 of the groove 64 and the coil is minimized in order to reduce noise.

Figure 8A:
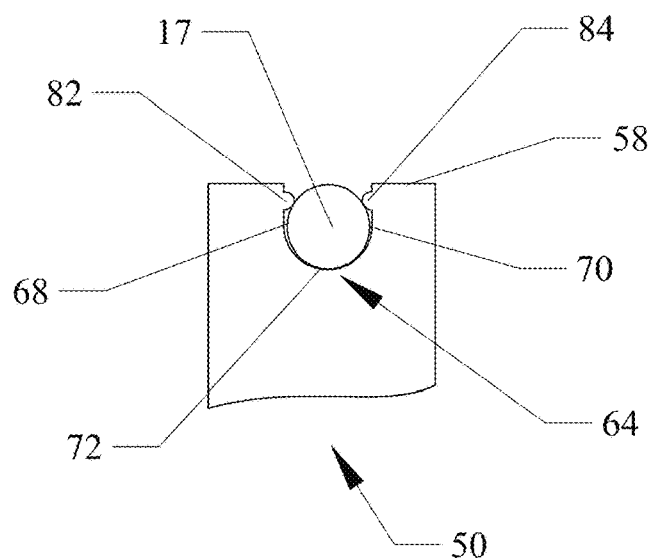
FIG. 8A is a partial cross sectional view of the top retaining groove of one embodiment of the tuning ring of the present invention in which the retaining structure is a pair of top ribs.

FIG. 8A shows a ring 50 having a pair of top ribs 82, 84 extending from the sides 68, 70 of the retaining groove 64 proximate the top 58. Coil 17 is disposed within and extends from the semicircular bottom 72, which has a diameter that is preferably slightly greater than the diameter of the coil 17 and results in reduced contact between the coil 17 and sides 68, 70 and bottom 72 of the retaining groove 64. In this embodiment, the top ribs 82, 84 extend inward such that the distance between the ribs 82, 84 is less than the diameter of the coil 17, which allow the ribs 82, 84 to act as a stop that prevents the coil 17 from exiting the retaining groove 64. In FIG. 8A, the ribs 82, 84 are shown as contacting the coil 17 but these ribs 82, 84 may be disposed such that they only contact the coil 17 when the coil 17 moves upward.

Figure 8B:
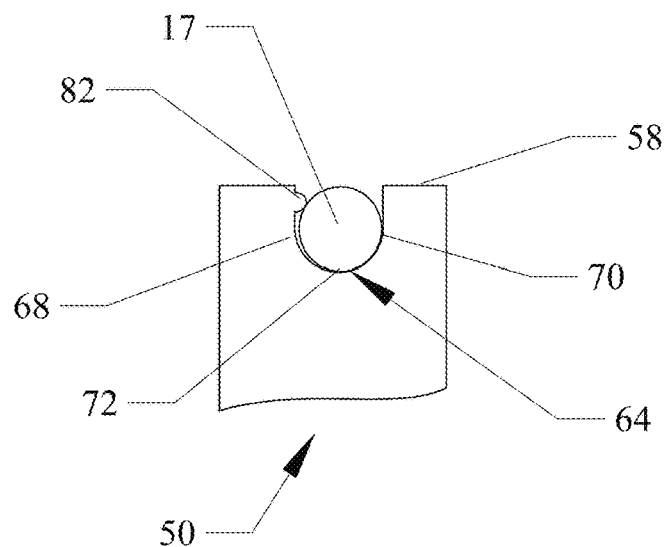
FIG. 8B is a partial cross sectional view of the top retaining groove of one embodiment of the tuning ring of the present invention in which the retaining structure is a single top rib.

FIG. 8B shows a ring 50 having a single top rib 82 extending from the side 68 of the retaining groove 64 proximate the top 58. Coil 17 is disposed within and extends from the semicircular bottom 72, which has a diameter that is preferably slightly greater than the diameter of the coil 17 and results in reduced contact between the coil 17 and sides 68, 70 and bottom 72 of the retaining groove 64. In this embodiment, the top rib 82 extends inward such that the distance between the rib 82 and the side 70 of the retaining groove 64 is less than the diameter of the coil 17, which allows the rib 82 to act as a stop that prevents the coil 17 from exiting the retaining groove 64. In FIG. 8B, the rib 82 contacts the coil 17 and forces it against the side 70 of the retaining groove 64. However, as was the case with the embodiment of FIG. 8A, this rib 82 may be disposed such that it only contacts the coil 17 when the coil 17 moves upward.

Figure 8C:
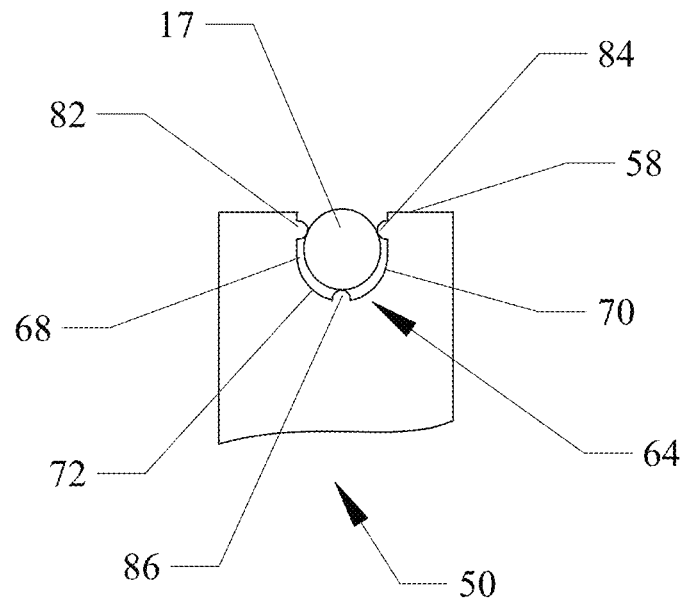
FIG. 8C is a partial cross sectional view of the top retaining groove of one embodiment of the tuning ring of the present invention in which the retaining structure is a pair of top ribs and a bottom rib.

FIG. 8C shows a ring 50 having a pair of top ribs 82, 84 extending from the sides 68, 70 of the retaining groove 64 proximate the top 58 and a bottom rib 86 extending from the bottom 72 of the retaining groove 64. Coil 17 is disposed within and held in place by top ribs 82, 84 and bottom rib 86, which retains coil 17 in place such that it does not contact sides 68, 70 or the semicircular bottom 72. This arrangement greatly reduces the contact surface area between the coil 17 and the ring 50 and, as a result, greatly reduces noise produced thereby.

Figure 8D:
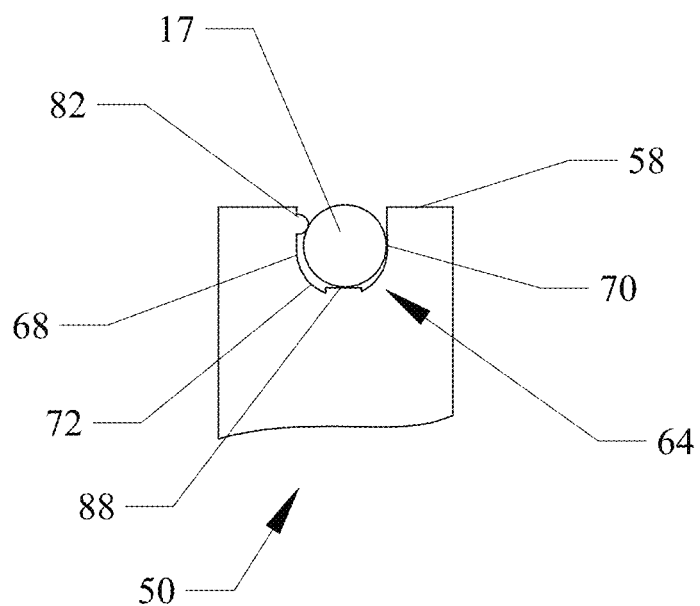
FIG. 8D is a partial cross sectional view of the top retaining groove of one embodiment of the tuning ring of the present invention in which the retaining structure is a single top rib and a bottom base section.

FIG. 8D shows a ring 50 having a single top rib 82 extending from one side 68 of the retaining groove 64 proximate the top 58 and a bottom base section 88 extending from the bottom 72 of the retaining groove 64. This embodiment is similar to the embodiment of FIG. 8B insofar as the top rib 82 extends inward such that the distance between the rib 82 and the side 70 of the retaining groove 64 is less than the diameter of the coil 17, which allows the rib 82 to act as a stop that prevents the coil 17 from exiting the retaining groove 64. Bottom base section 88 extends from the semicircular bottom 72 and, in the embodiment of FIG. 8D, includes a planar surface, rather than the rounded surface of bottom rib 86, for example. However, in some embodiments, this bottom base section 88 includes high frequency dampening elements 95, such as those shown in FIGS. 9A-9D, which are designed to dampen vibration and reduce noise caused by translation of the spring and the sticking and slipping of the spring as this translation occurs, known in the industry at "stick slip". High frequency dampening elements 95 reduce the force exerted by the ring on the spring, which reduces the amount of stick slip and the noise caused thereby.

Figure 8E:
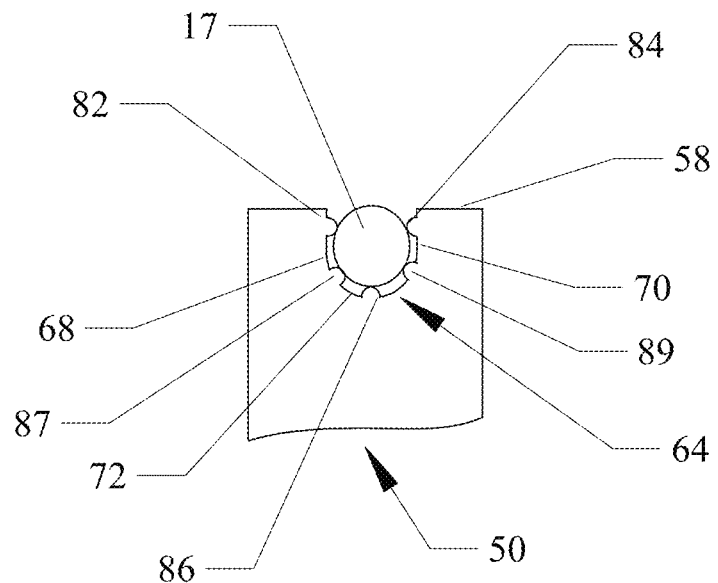
FIG. 8E is a partial cross sectional view of the top retaining groove of one embodiment of the tuning ring of the present invention in which the retaining structure is a pair of top ribs, a bottom rib, and a pair of intermediate ribs.

FIG. 8E shows a ring 50 having a pair of top ribs 82, 84 extending from the sides 68, 70 of the retaining groove 64 proximate the top 58, a bottom rib 86 extending from the bottom 72 of the retaining groove 64, and a pair of intermediate ribs 87, 89 positioned between the top ribs 82, 84 and the bottom rib 86. Coil 17 is disposed within and held in place by top ribs 82, 84, bottom rib 86, and intermediate ribs 87, 89, which retain coil 17 in place such that it does not contact sides 68, 70 or the semicircular bottom 72. As was the case with the embodiment shown in FIG. 8C, this arrangement greatly reduces the contact surface area between the coil 17 and the ring 50 and, as a result, greatly reduces noise produced.

Figure 8F:
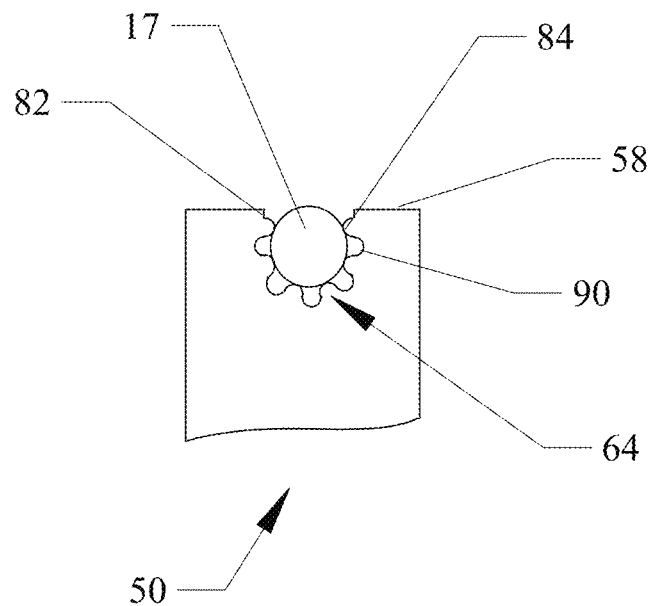
FIG. 8F is a partial cross sectional view of the top retaining groove of one embodiment of the tuning ring of the present invention in which the retaining structure is a waveform rib.
Figure 9A:
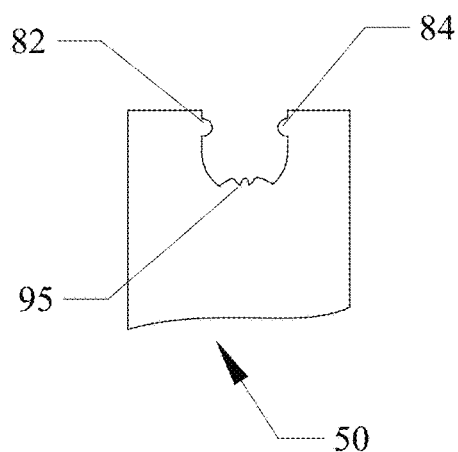
FIG. 9A is a partial cross sectional view of the top retaining groove of one embodiment of the tuning ring of the present invention in which the retaining structure is a pair of top ribs and a bottom base section that includes a high frequency dampening element having a waved shape.
Figure 9B:
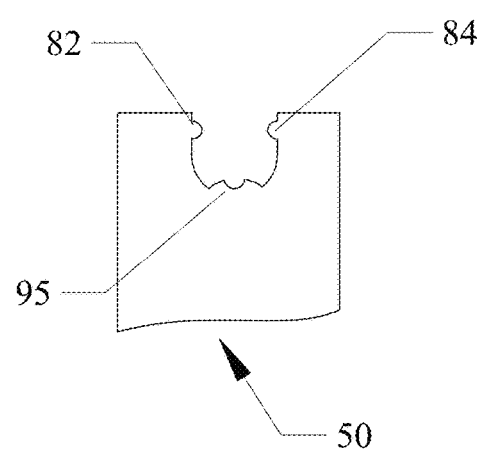
FIG. 9B is a partial cross sectional view of the top retaining groove of one embodiment of the tuning ring of the present invention in which the retaining structure is a pair of top ribs and a bottom base section that includes a high frequency dampening element having a rounded shape with a central semicircular cutout.
Figure 9C:
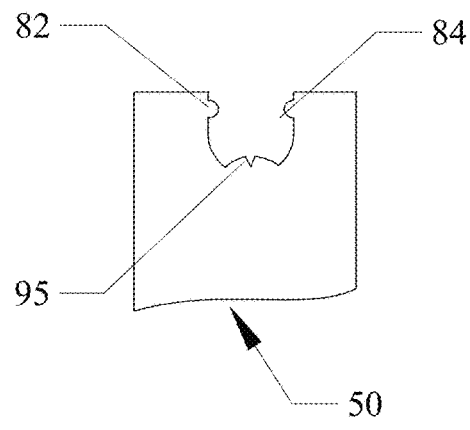
FIG. 9C is a partial cross sectional view of the top retaining groove of one embodiment of the tuning ring of the present invention in which the retaining structure is a pair of top ribs and a bottom base section that includes a high frequency dampening element having a rounded shape with a central v-shaped cutout.
Figure 9D:
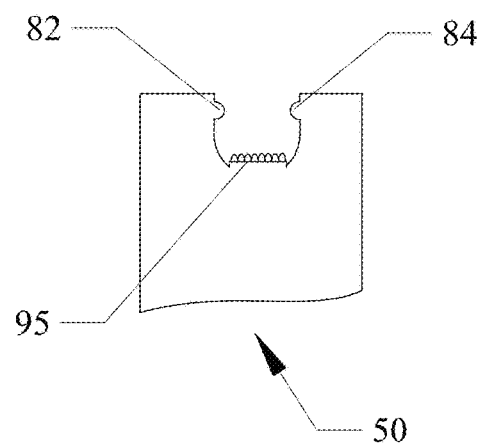
FIG. 9D is a partial cross sectional view of the top retaining groove of one embodiment of the tuning ring of the present invention in which the retaining structure is a pair of top ribs and a bottom base section that includes a series of micro-ribs as a high frequency dampening element.

FIG. 8F shows a ring 50 having a pair of top ribs 82, 84 extending from the sides 68, 70 of the retaining groove 64 proximate the top 58, and waveform ribs 90 along the sides 68, 70 and bottom 72 of the retaining groove 64. These waveform ribs 90 may take many forms and, like the ribs of the embodiments of FIGS. 8C and 8E, is the ribs 90 are shaped and dimensioned to retain coil 17 in place such that it does not contact sides 68, 70 or the semicircular bottom 72.

In some embodiments of the invention, the ribs shown and described with reference to FIGS. 8A-8F are not continuous ribs that result in the same cross section at all points around the ring 50 but, rather, are segmented such that surface area is further reduced. In still further embodiments, the ribs are replaced by hemispherical bumps or other shaped details. Because the ring 50 is manufactured using a molding process, the variety of arrangements is nearly endless. However, regardless of what arrangement is selected, the various retaining structures perform the function of retaining a coil 17, 19 of the spring 16 within each groove 64, 66. Further, in preferred embodiments, the retaining structures also reduce the amount of noise produced by the engagement of the retaining grooves 64, 66 and the coils 17, 19 of the spring.

Figure 10A:
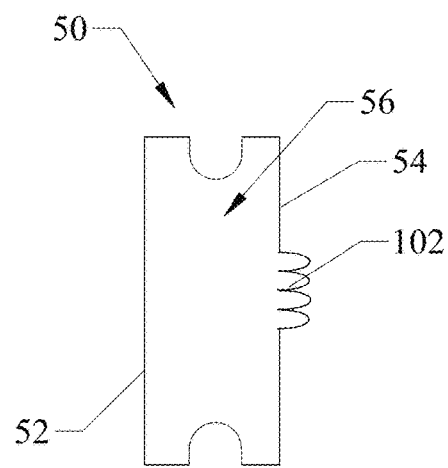
FIG. 10A is a side cross sectional view of one embodiment of the tuning ring that includes ribs on the inner surface.
Figure 10B:
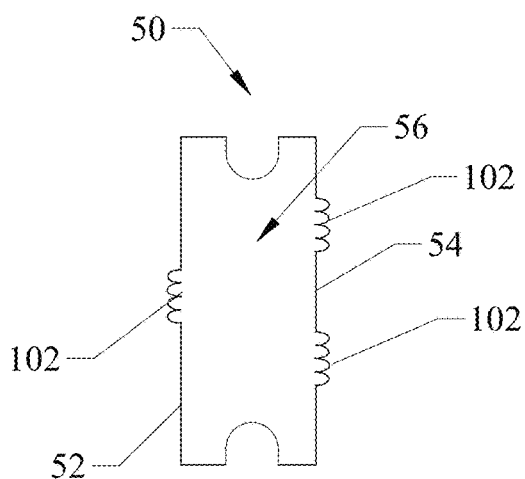
FIG. 10B is a side cross sectional view of one embodiment of the tuning ring that includes two sets of ribs on the inner surface and one set of ribs on the outer surface.
Figure 10C:
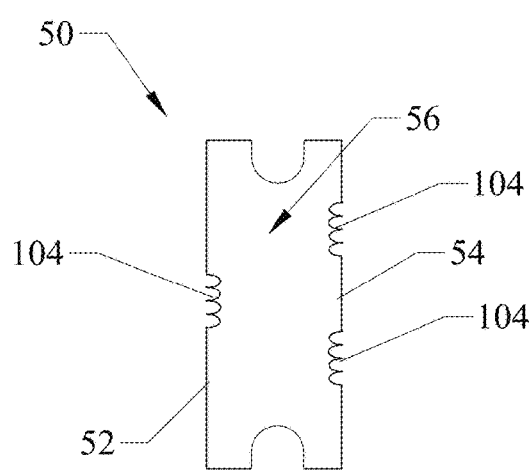
FIG. 10C is a side cross sectional view of one embodiment of the tuning ring that includes two sets of rounded radial grooves formed into the inner surface and one set of rounded radial grooves formed into the outer surface.
Figure 10D:
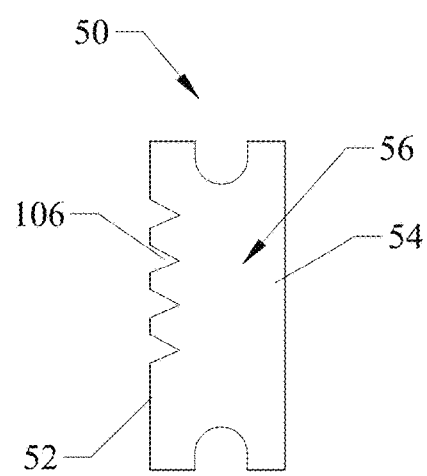
FIG. 10D is a side cross sectional view of one embodiment of the tuning ring that includes one set of angled radial grooves on the outer surface.

Referring now to FIGS. 10A-10D, the performance of the tuning ring 50 may be altered by including shapes on the inner and/or outer surfaces of the tuning ring 50. FIG. 10A shows an embodiment with rounded ribs 102 extending from the inner surface 54. The rounded ribs 102 have a positive influence on the compression pattern and reduce the risk of the wall 56 of the ring 50 buckling during compression. FIG. 10B shows an embodiment with two sets of rounded ribs 102 on the inner surface 54 and one set of rounded ribs 102 on the outer surface 52. The inclusion of additional sets of rounded ribs 102 at various locations may be used to further stiffen the ring 50. Further, displacement occurs at different frequencies with low displacement occurring at higher frequencies and large displacement occurring a lower frequencies. As a result, the inclusion of additional sets of ribs 102 allows the ring to perform differently based upon frequency and displacement. FIGS. 10C and 10D show embodiments of the tuning ring 50 that include radial grooves 104, 106 formed into one or more of the inner surface 54 and outer surface 52. The inclusion of radial grooves 104, 106 tends to promote compression and softens the combined spring and ring 50. FIG. 10C shows two sets of rounded radial grooves 104 formed into the inner surface 54 and one set of rounded radial grooves 104 formed into the outer surface 52. Rounded radial grooves 104 induce greater compression of the ring 50. FIG. 10D shows one set of angled radial grooves 106 on the outer surface 52. Angled radial grooves 106 tend to induce bending of the ring 50. This tends to soften the combined spring and ring 50, which is desired in some circumstances.

Figure 11A:
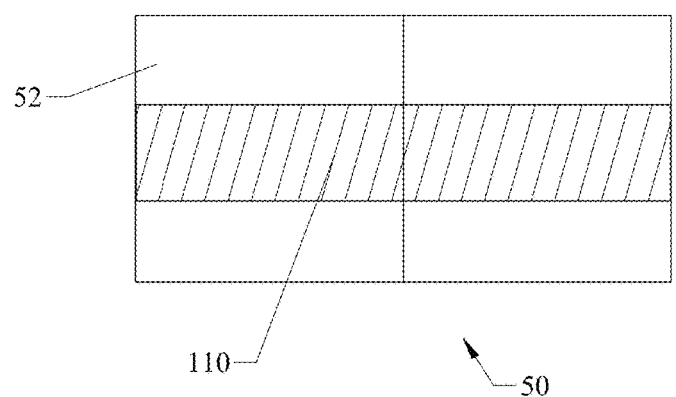
FIG. 11A is a perspective view of a one embodiment of the suspension tuning ring of the present invention in which a sleeve is disposed in a notch into the outer surface.
Figure 11B:
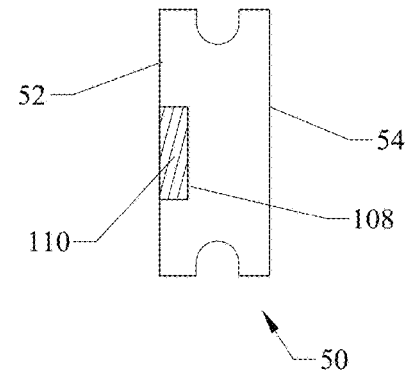
FIG. 11B is a side cross sectional view of the tuning ring of FIG. 11A showing the rigid sleeve and notch.

FIGS. 11A and 11B show an embodiment of the suspension tuning ring 50 of the present invention in which a sleeve 110 is disposed within a notch 108 into the outer surface 52 of the ring 50. The use of a sleeve causes the progressivity of the spring to start earlier, which is desired in some circumstances.

Figure 12A:
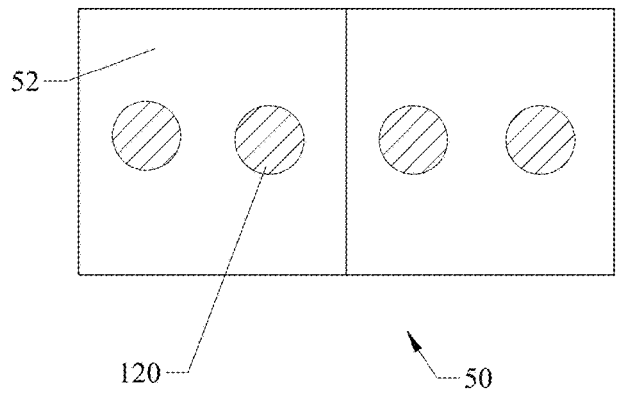
FIG. 12A is a perspective view of a one embodiment of the suspension tuning ring of the present invention in which openings are disposed through the wall.
Figure 12B:
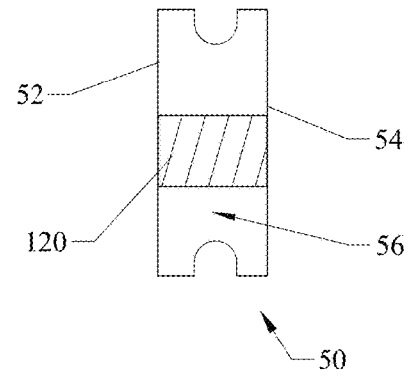
FIG. 12B is a side cross sectional view of the tuning ring of FIG. 12A showing an opening through the wall.

FIGS. 12A and 12B show an embodiment of the suspension tuning ring 50 of the present invention in which openings 120 are disposed through the wall 56 of the ring 50. The use of openings 56 through the wall 56 acts to soften the spring and cause the progressivity of the spring to start later, which is desired in some circumstances. Although the openings 120 in FIGS. 12A and 12B are shown as relatively large openings 120 of the same diameter spaced substantially evenly around the circumference of the ring 50, openings 120 of varying sizes and placements may be utilized in order to alter the softness of the spring for a desired application.

A pair of rings 50 of the present invention will be packaged together and sold as a kit to allow a user to tune the performance of their suspension system. In some embodiments, the kit includes multiple sets of tuning rings 50, each having different spring rate characteristics, which may be interchanged by a user to tune the snowmobile's ride. These rings may be substituted for each other on a spring, such as in FIG. 5, or combined together on a spring, such as in FIG. 7.

Finally, it is envisioned that springs will be sold with tuning rings included. Accordingly, the suspension spring kit of the present invention includes a coil spring and the suspension tuning device of the present invention removably attached thereto.

It is noted that, although the present invention has been described with reference to snowmobiles, it is readily adapted for use with any off-road vehicles, including four wheelers, UTV's, side by sides, dirt bikes, snow bikes, and the like. It is also beneficial for use in trucks and other vehicles to increase or recover ride height when a plow is attached to the front, or to adjust the ride when a heavy load is placed in the rear.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

What is claimed is:

1. A suspension tuning device for attachment to a helical coil spring having a plurality of coils, wherein each coil has a coil material diameter, an outer diameter and an inner diameter, and wherein a distance between one coil and an adjacent coil defines a space, wherein said suspension tuning devices comprises:
   a hollow cylindrical microcellular urethane tuning ring comprising:
      an outer surface having an outer diameter greater than the outer diameter of the coil spring;
      an inner surface having an inner diameter less than the inner diameter of the coil spring;
      a wall defined by said outer surface and said inner surface;
      a top;
      a bottom;
      a thickness extending between by said top and said bottom, wherein said thickness is greater than the space between one coil and the adjacent coil of the spring;
      a slit through said wall, extending between said top and said bottom;
      a top retaining groove disposed into said wall through said top and shaped and dimensioned to accommodate one coil of the spring;
      a bottom retaining groove disposed into said wall through said bottom and shaped and dimensioned to accommodate the adjacent coil of the spring;
      wherein said top retaining groove and said bottom retaining groove are spaced apart such that said tuning ring fits within the space between one coil and the adjacent coil of the spring when one coil is fitted within said top retaining groove and the adjacent coil is fitted within said bottom retaining groove;
      wherein said top retaining groove and said bottom retaining groove each comprise first and second sides and a substantially semicircular bottom; and
      means for retaining at least one coil of the spring within at least one of said top retaining groove and said bottom retaining groove, wherein said means for retaining at least one coil of the spring within at least one of said top retaining groove and said bottom retaining groove comprises at least one retaining structure extending from at least one of said first and second sides of at least one of said top retaining groove and said bottom retaining groove.

2. The suspension tuning device as claimed in claim 1 wherein said at least one retaining structure comprises at least one rib extending from at least one of said first and second sides of said top retaining groove proximate of said top of said tuning ring.

3. The suspension tuning device as claimed in claim 2 wherein said at least one rib comprises first and second ribs:
   wherein said first rib extends from said first side of said top retaining groove proximate to said top of said tuning ring;
   wherein said second rib extends from said second side of said top retaining groove proximate to said top of said tuning ring; and
   wherein a distance between said first rib and said second rib is less than the coil material diameter.

4. The suspension tuning device as claimed in claim 2 wherein said at least one retaining structure further comprises a bottom rib extending from said bottom of said retaining groove.

5. The suspension tuning device as claimed in claim 3 wherein said at least one retaining structure further comprises a bottom rib extending from said bottom of said retaining groove.

6. The suspension tuning device as claimed in claim 5 wherein said at least one retaining structure further comprises at least one intermediate rib positioned between at least one of said first and second ribs and said bottom rib.

7. The suspension tuning device as claimed in claim 2 wherein said at least one retaining structure further comprises a bottom base section extending from said bottom of the retaining groove, and wherein said bottom base section comprises at least one high frequency dampening element.

8. The suspension tuning device as claimed in claim 3 wherein said at least one retaining structure further comprises a bottom base section extending from said bottom of the retaining groove, and wherein said bottom base section comprises at least one high frequency dampening element.

9. The suspension tuning device as claimed in claim 2 wherein said at least one retaining structure further comprises a plurality of waveform ribs extending from said first and second sides and said bottom of said top retaining groove.

10. The suspension tuning device as claimed in claim 1 wherein at least one of said inner surface and said outer surface comprises at least one radial rib extending therefrom.

11. The suspension tuning device as claimed in claim 1 wherein at least one of said inner surface and said outer surface comprises at least one radial groove formed therein.

12. The suspension tuning device as claimed in claim 1 wherein said outer surface of said tuning ring comprises at least one notch disposed therein and wherein said suspension tuning device further comprises a sleeve disposed within said notch in said outer surface.

13. The suspension tuning device as claimed in claim 1 wherein said tuning ring is formed from a fully cross-linked, aromatic isocynate based microcellular urethane having a density of between 0.25 and 0.85 grams per cubic centimeter, a tensile strength of at least 5.0 Mpa, and a rebound resilience of between 45 and 60 percent.

14. A suspension tuning kit for attachment to a pair of helical coil springs, each having a plurality of coils, wherein each coil has an outer and an inner diameter, and wherein a distance between one coil and an adjacent coil defines a space, wherein said suspension tuning devices comprises:
at least two hollow cylindrical microcellular urethane tuning rings, each comprising:
an outer surface having an outer diameter greater than the outer diameter of the coil spring;
an inner surface having an inner diameter less than the inner diameter of the coil spring;
a wall defined by said outer surface and said inner surface;
a top;
a bottom;
a thickness extending between said top and said bottom, wherein said thickness is greater than the space between one coil and the adjacent coil of the spring;
a slit through said wall, extending between said top and said bottom;
a top retaining groove disposed into said wall through said top and shaped and dimensioned to accommodate one coil of the spring;
a bottom retaining groove disposed into said wall through said bottom and shaped and dimensioned to accommodate the adjacent coil of the spring;
wherein said top retaining groove and said bottom retaining groove are spaced apart such that said tuning ring fits within the space between one coil and the adjacent coil of the spring when one coil is fitted within said top retaining groove and the adjacent coil is fitted within said bottom retaining groove;
wherein said top retaining groove and said bottom retaining groove each comprise first and second sides and a substantially semicircular bottom; and
means for retaining at least one coil of the spring within at least one of said top retaining groove and said bottom retaining groove, wherein said means for retaining at least one coil of the spring within at least one of said top retaining groove and said bottom retaining groove comprises at least one retaining structure extending from at least one of said first and second sides of at least one of said top retaining groove and said bottom retaining groove.

15. The suspension tuning kit as claimed in claim 14, wherein a first of said at least two hollow cylindrical microcellular urethane tuning rings has a first performance characteristic and wherein a second of said at least two hollow cylindrical microcellular urethane tuning rings has a second performance characteristic.

16. A suspension spring kit comprising:
a helical coil spring having a plurality of coils, wherein each coil has an outer diameter and an inner diameter, and wherein a distance between one coil and an adjacent coil defines a space; and
at least one hollow cylindrical microcellular urethane tuning ring comprising:
an outer surface having an outer diameter greater than said outer diameter of said coil spring;
an inner surface having an inner diameter less than said inner diameter of said coil spring;
a wall defined by said outer surface and said inner surface;
a top;
a bottom;
a thickness extending between said top and said bottom, wherein said thickness is greater than said space between said one coil and said adjacent coil of said coil spring;
a slit through said wall, extending between said top and said bottom;
a top retaining groove disposed into said wall through said top and shaped and dimensioned to accommodate said one coil of said spring;
a bottom retaining groove disposed into said wall through said bottom and shaped and dimensioned to accommodate said adjacent coil of said spring;
wherein said top retaining groove and said bottom retaining groove are spaced apart such that said tuning ring fits within said space between said one coil and said adjacent coil of said coil spring when said one coil is fitted within said top retaining groove and said adjacent coil is fitted within said bottom retaining groove;
wherein said top retaining groove and said bottom retaining groove each comprise first and second sides and a substantially semicircular bottom; and means for retaining at least said one coil of said coil spring within at least one of said top retaining groove and said bottom retaining groove, wherein said means for retaining at least one coil of the spring within at least one of said top retaining groove and said bottom retaining groove comprises at least one retaining structure extending from at least one of said first and second sides of at least one of said top retaining groove and said bottom retaining groove.

17. The suspension spring kit as claimed in claim 16, wherein said at least one hollow cylindrical microcellular urethane tuning ring comprises at least two hollow cylindrical microcellular urethane tuning rings.

18. The suspension spring kit as claimed in claim 17 wherein a first of said at least two hollow tuning rings has a first performance characteristic and wherein a second of said at least two hollow tuning rings has a second performance characteristic.

\* \* \* \* \*